United States Patent
Royer et al.

(10) Patent No.: US 11,897,293 B2
(45) Date of Patent: Feb. 13, 2024

(54) CONSTRUCTION PLANT VEHICLE TIRE WITH LOW ENVIRONMENTAL FOOTPRINT

(71) Applicant: COMPAGNIE GENERALE DES ETABLISSEMENTS MICHELIN, Clermont-Ferrand (FR)

(72) Inventors: Thierry Royer, Clermont-Ferrand (FR); Patricia Lagarde, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 207 days.

(21) Appl. No.: 17/625,972

(22) PCT Filed: Jul. 7, 2020

(86) PCT No.: PCT/FR2020/051201
§ 371 (c)(1),
(2) Date: Jan. 10, 2022

(87) PCT Pub. No.: WO2021/005301
PCT Pub. Date: Jan. 14, 2021

(65) Prior Publication Data
US 2022/0250420 A1    Aug. 11, 2022

(30) Foreign Application Priority Data
Jul. 11, 2019    (FR) .................................. 1907777

(51) Int. Cl.
*B60C 19/08*    (2006.01)
*B60C 1/00*    (2006.01)
(Continued)

(52) U.S. Cl.
CPC ............ *B60C 19/08* (2013.01); *B60C 1/0016* (2013.01); *B60C 1/0025* (2013.01);
(Continued)

(58) Field of Classification Search
CPC ..... B60C 19/08; B60C 19/082; B60C 19/084; B60C 19/086; B60C 19/088
See application file for complete search history.

(56) References Cited

U.S. PATENT DOCUMENTS 10,328,750 B2    6/2019    Rehab et al.
11,383,561 B2    7/2022    Royer
(Continued)

FOREIGN PATENT DOCUMENTS

EP    3238958 A1    11/2017
FR    3022838 A1    1/2016
(Continued)

OTHER PUBLICATIONS

International Search Report dated Sep. 15, 2020, in corresponding PCT/FR2020/051201 (5 pages).

*Primary Examiner* — Kendra Ly
(74) *Attorney, Agent, or Firm* — VENABLE LLP (57) ABSTRACT

The environmental footprint of a tire for a construction plant vehicle is improved. To do so, the elastomer compounds derived from non-fossil resources represent a mass content greater than or equal to 65% of the total mass of the compounds of the tire, at least 75% of the total mass of the compounds of the tire is made up of elastomer compounds each of which has a viscoelastic loss, measured in terms of tan($\delta$), less than or equal to 0.065, and an electrical resistivity greater than or equal to 1E+10 '$\Omega$·cm.

15 Claims, 1 Drawing Sheet

(51) Int. Cl.
    *B60C 11/00*     (2006.01)
    *B60C 9/18*     (2006.01)
    *B60C 15/06*     (2006.01)

(52) U.S. Cl.
    CPC ............ *B60C 1/0041* (2013.01); *B60C 9/185* (2013.01); *B60C 11/0058* (2013.01); *B60C 19/082* (2013.01); *B60C 19/084* (2013.01); *B60C 2001/0066* (2013.01); *B60C 2001/0075* (2013.01); *B60C 2011/0025* (2013.01); *B60C 2015/0621* (2013.01); *B60C 2200/065* (2013.01)

(56) References Cited

U.S. PATENT DOCUMENTS

| | | | |
|---|---|---|---|
| 2010/0243115 A1* | 9/2010 | Wada | B60C 19/08 |
| | | | 152/152.1 |
| 2016/0059634 A1* | 3/2016 | Meza | B60C 11/0058 |
| | | | 152/209.5 |
| 2017/0197469 A1 | 7/2017 | Rehab et al. | |
| 2019/0351716 A1 | 11/2019 | Lemarchand et al. | |
| 2020/0070577 A1 | 3/2020 | Lemarchand et al. | |
| 2021/0078370 A1 | 3/2021 | Royer | |

FOREIGN PATENT DOCUMENTS

| | | |
|---|---|---|
| JP | 2000-25413 A | 1/2000 |
| WO | 2018/134488 A1 | 7/2018 |
| WO | 2018/202968 A1 | 11/2018 |
| WO | 2019/122618 A1 | 6/2019 |

\* cited by examiner

CONSTRUCTION PLANT VEHICLE TIRE WITH LOW ENVIRONMENTAL FOOTPRINT

BACKGROUND

The present invention relates to a radial tyre intended to be fitted to a heavy-duty vehicle of construction plant type, and more particularly to the elastomer compounds used in the manufacture of such tyres.

A radial tyre for a heavy-duty vehicle of construction plant type is intended to be mounted on a rim, the seat diameter of which is 25 inches or more, according to the European Tyre and Rim Technical Organisation or ETRTO standard.

For example, vehicles equipped with these tyres are used in opencast mines for transporting, at a maximum speed of 65 km/h, materials extracted from quarries and which may represent a payload of over 350 tonnes. The tyres have to be sized accordingly with an overall diameter that may measure over 4 metres and may weigh 5 tonnes each.

By way of illustration, such a tyre has a standardized designation according to the ETRTO (European Technical Rim and Tyre Organisation) of the type 50/80 R 57, with an inflation pressure of 650 kPa, which means that the nominal width of the tread is 50 inches, that the sidewall height of the tyre is 80% of the nominal tyre width, and that this tyre is intended to be mounted on a wheel with a diameter of 57 inches.

Generally, since a tyre has a geometry exhibiting symmetry of revolution about an axis of rotation, its geometry is described in a meridian plane containing its axis of rotation. For a given meridian plane, the radial, axial and circumferential directions denote the directions perpendicular to the axis of rotation, parallel to the axis of rotation and perpendicular to the meridian plane, respectively.

In the following text, the expressions "radially inner/radially on the inside" and "radially outer/radially on the outside" mean "closer to" and "further away from the axis of rotation of the tyre", respectively. "Axially inner/axially on the inside" and "axially outer/axially on the outside" mean "closer to" and "further away from the equatorial plane of the tyre", respectively, with the equatorial plane of the tyre being the plane that passes through the middle of the tread surface and is perpendicular to the axis of rotation.

A tyre comprises a crown intended to come into contact with the ground via a tread, the two axial ends of which are connected via two sidewalls to two beads that provide the mechanical connection between the tyre and the rim on which it is intended to be mounted.

A radial tyre further comprises a reinforcement made up of a crown reinforcement radially on the inside of the tread and of a carcass reinforcement radially on the inside of the crown reinforcement.

The crown reinforcement of a radial tyre comprises a superposition of circumferentially extending crown layers radially on the outside of the carcass reinforcement. Each crown layer is made up of usually metal reinforcers that are mutually parallel and coated in a polymeric material of the elastomer or elastomer compound type. The assembly made up of the crown reinforcement and the tread is referred to as the crown.

The carcass reinforcement of a radial tyre for a heavy-duty vehicle of construction plant type usually comprises at least one carcass layer consisting of metal reinforcing elements coated in an elastomer coating mixture. The metal reinforcing elements are substantially parallel to one another and form an angle of between 85° and 95° with the circumferential direction. The carcass layer comprises a main part connecting the two beads to one another and wrapped, in each bead, around a bead wire. The bead wire comprises a circumferential reinforcing element, usually made of metal, surrounded, non-exhaustively, by at least one elastomer or textile material. The carcass layer is wrapped around the bead wire from the inside towards the outside of the tyre to form a turn-up comprising an end. The turn-up, in each bead, allows the carcass reinforcement layer to be anchored to the bead wire of the bead.

Each bead comprises a filling element that extends the bead wire radially outwards. The filling element consists of at least one elastomer filling compound. The filling element axially separates the main part from the turn-up.

Each bead also comprises a protective element extending the sidewall radially towards the inside and which is axially on the outside of the turn-up. The protective element is also at least partially in contact via its axially exterior face with the flange of the rim. The protective element consists of at least one elastomer protective compound.

Each bead finally comprises a filler element axially on the inside of the sidewall and the protective element and axially on the outside of the turn-up. The filler element consists of at least one elastomer filler compound.

Each tyre sidewall comprises at least one sidewall layer consisting of an elastomer compound and extending axially towards the inside of the tyre from an exterior face of the tyre, in contact with the atmospheric air. At least in the region of greatest axial width of the tyre, the sidewall extends axially inwards to an axially outermost carcass layer of the carcass reinforcement.

A shoulder region is that portion of the tyre that connects a sidewall to the tread. More specifically, it is comprised between, on the one hand, the straight line normal to the carcass layer and passing through the middle of the sidewall, and, on the other hand, the straight line normal to the carcass layer passing through the point situated on the tread at an axial distance equal to $\frac{4}{5}$ of its nominal width relative to the equatorial plane.

Radial tyres for construction plant vehicles have a carcass reinforcement that is connected to the crown reinforcement by a cushion elastomer compound layer positioned along the carcass layer, axially towards the outside in the shoulder region. This cushion compound, hereafter referred to as the carcass-crown coupling compound, couples the carcass reinforcement to the crown reinforcement. The pressurizing of the tyre mounted on its rim creates tensions in the carcass layer reinforcers, which in turn create shear in the carcass-crown coupling compound, which then tensions the crown reinforcement reinforcers. The role of this coupling compound is essential for the satisfactory operation of the tyre.

An elastomer compound is understood to be an elastomer material obtained by blending its various constituents. An elastomer compound conventionally comprises an elastomer matrix comprising at least one diene elastomer of the natural or synthetic rubber type, at least one reinforcing filler of the carbon black type and/or of the silica type, a crosslinking system that is usually sulfur-based, and protective agents.

The expression "composition based on/-based composition" should be understood as meaning a composition including the mixture and/or the reaction product of the various constituents used, some of these base constituents being capable of reacting, or intended to react, with one another, at least partially, during the various phases of manufacture of the composition, in particular during its crosslinking or vulcanization.

The expression "part by weight per hundred parts by weight of elastomer" (or phr) should be understood as meaning, within the meaning of the present invention, the proportion by weight per hundred parts of elastomer present in the rubber composition under consideration.

An elastomer compound can be mechanically characterized, in particular after curing, by its dynamic properties, such as a dynamic shear modulus $G^*=(G'2+G''2)^{1/2}$, where $G'$ is the elastic shear modulus and $G''$ is the viscous shear modulus, and a dynamic loss $\tan\delta=G''/G'$. The dynamic shear modulus $G^*$ and the dynamic loss $\tan\delta$ are measured on a viscosity analyser of the Metravib VA4000 type according to standard ASTM D 5992-96. The response of a sample of elastomer compound vulcanized at between 120° C. and 130° C. and in the form of a cylindrical test specimen with a thickness of 4 mm and a cross section of 400 mm², subjected to a simple alternating sinusoidal shear stress, at a frequency of 10 Hz, with a deformation amplitude sweep from 0.1% to 50% (outward cycle) and then from 50% to 0.1% (return cycle), at a given temperature, for example equal to 60° C., is recorded. These dynamic properties are thus measured for a frequency equal to 10 Hz, a deformation equal to 50% of the peak-to-peak deformation amplitude, and a temperature that may be equal to 60° C. or 100° C.

An elastomer compound can also be characterized by static mechanical properties. The tensile tests make it possible to determine the elasticity stresses and the properties at break. Unless indicated otherwise, they are carried out in accordance with the French standard NF T 46-002 of September 1988. The secant moduli known as "nominal" secant moduli (or apparent stresses, in MPa) at 10% elongation (denoted "MA10") and 100% elongation ("MA100") are measured in second elongation (i.e. after an accommodation cycle). All these tensile measurements are carried out under standard temperature (23±2° C.) and hygrometry (50±5% relative humidity) conditions, according to the French standard NF T 40-101 (December 1979). The breaking stresses (in MPa) and the elongations at break (in %) are also measured, at a temperature of 23° C.

An elastomer compound can also be characterized by its electrical resistivity, which characterizes the ability of the compound to let the electric charges move freely, and therefore to allow an electric current to flow. The electrical resistivity is generally denoted $\rho$, and its unit of measurement is in ohm-metres ($\Omega \cdot m$), but it is normal, in the field of tyres, to express the measurement of electrical resistivity in ohm-centimetres ($\Omega \cdot cm$). The test for measuring electrical resistivity is described, for example, in the standard ASTM-D257. An electrical resistivity of 1 $\Omega \cdot m$, or of $10^2$ '$\Omega \cdot cm$, corresponds to the resistance to the flow of electric current in a cylindrical portion of compound with a length of 1 m and a cross section of 1 m². Electrical conductivity is the inverse of electrical resistivity, denoted $\sigma$ and satisfying $\sigma=1/\rho$. In the following text, either electrical conductivity $\sigma$ or electrical resistivity $\rho$ will be used, depending on the context, to characterize the electrical properties of the compounds.

A material that is very weakly electrically conductive or which is electrically resistant is understood to be a material having an electrical resistivity greater than $10^8$ '$\Omega \cdot cm$. Similarly, a material that is electrically conductive is understood to be a material that has a resistivity less than $10^6$ $\Omega \cdot cm$. These materials may or may not be elastomer compounds.

The usual running conditions, in terms of pressure, load and speed, for a tyre for a heavy-duty vehicle of construction plant type such as, for example, a dumper intended to transport materials extracted from quarries or opencast surface mines, are particularly harsh. By way of example, on sites at which materials, such as ores or coal, are extracted, the use of a vehicle of dumper type consists, in simplified form, of an alternation of laden outbound cycles and of unladen return cycles. In a laden outbound cycle, the laden vehicle transports the extracted materials, mainly uphill, from loading zones at the bottom of the mine, or the bottom of the pit, to unloading zones, thereby requiring that the tyres have good grip in traction. In an unladen return cycle, the empty vehicle returns, mainly downhill, towards the loading zones at the bottom of the mine.

The tyre represents the main cost item for these transport vehicles which means that the longevity thereof is one of the key criteria in the requirements specification drawn up by the customers that manufacture these vehicles. The aim is to be able to use a fitted set of tyres for as long as possible by achieving a suitable compromise between longevity and endurance. The tyre needs to be robust enough to withstand greater longevity.

The environmental impact of such tyres also features in the requirements specifications drawn up by the customers that manufacture these vehicles. A size such as 50/80 R57 has a total mass of 3.8 tonnes, of which 1 tonne is the metal components and 2.8 tonnes, namely 74% of the total mass of the tyre, is the mass of the elastomer compounds. The metal components comprise the two bead wires, plus all the composite layers formed of metal reinforcers coated in elastomer compounds.

In the prior art, these elastomer compounds are derived chiefly from fossil raw materials such as petroleum. These are therefore essentially hydrocarbons derived from the methanization of living creatures that have died and been buried in the ground for several million years, sometimes up to 650 million years. Aside from the fact that these will inevitably become exhausted, the exploitation of these hydrocarbons is the cause of environmental problems relating to the ecological damage associated with their extraction and use.

The environmental impact can be measured at all steps in the creation of the tyre: from the extraction of the fossil raw materials, through the transformation thereof into elastomer compounds, the manufacture of the tyre and use thereof up to the end of its life.

SUMMARY

The inventors have therefore set themselves the objective of reducing the environmental impact of a tyre for construction plant vehicles without impairing the tyre performance such as endurance and electrical conductivity.

This objective has been achieved by a tyre for a heavy-duty vehicle of construction plant type, comprising:
  elastomer compounds derived from non-fossil and/or fossil resources, any elastomer compound having a viscoelastic loss $\tan(\delta)$ defined as being the ratio of the viscous shear modulus $G''$ to the elastic shear modulus $G'$, these modulus values being measured at a frequency of 10 Hz for a temperature of 100° C., and any electrically conductive elastomer compound being defined as having an electrical resistivity less than or equal to 1E+06 ohm-centimetre ('$\Omega \cdot cm$), measured in accordance with the standard ASTM-D257;
  a tread comprising two axial end portions or tread wings that are axially separated by a tread central portion;
  a crown reinforcement, radially on the inside of the tread, comprising at least one protective reinforcement and a working reinforcement, said reinforcements being formed respectively of protective layers and of working layers containing metal reinforcers coated with an elastomer compound, these layers at their axial ends having a layer of edging compound;

a carcass reinforcement, radially on the inside of the crown reinforcement, comprising at least one carcass layer made up of metal reinforcers coated in an electrically conductive coating elastomer compound, said metal reinforcers being substantially mutually parallel and forming, with the circumferential direction (XX'), an angle of between 85° and 95°, each carcass layer comprising a main part, connecting two beads to one another and wrapped, within each bead, around a bead wire to form a turn-up;

a carcass-crown coupling layer consisting of an electrically conductive elastomer compound and inserted between the carcass reinforcement and the crown reinforcement, axially towards the outside in the shoulder region;

two sidewalls connecting the tread wings to the two beads, said beads comprising a bead chafer layer intended to come into contact with a rim, such that:

the mass of the elastomer compounds derived from non-fossil resources is greater than or equal to 65% of the total mass of the elastomer compounds contained in the tyre, at least 75% of the total mass of the elastomer compounds contained in the tyre is made up of elastomer compounds each of which has a viscoelastic loss tan(δ) less than or equal to 0.065, and an electrical resistivity greater than or equal to 1E+10 'Ω·cm;

a linking layer, made up of an electrically conductive elastomer compound is inserted radially between the carcass-crown coupling layer and the carcass reinforcement, and is in contact at its axially exterior end with the tread wing and at its axially interior end with the carcass layer coating compound:

the tread wing, the linking layer, the carcass layer coating compound and the bead chafer layer constitute a preferred conductive pathway for conducting electrical charge between the ground and the rim when the tyre is mounted on its rim and compressed onto the ground.

DETAILED DESCRIPTION

The essential idea behind the invention is to replace those constituents of the various compounds present in the tyre, that are generally derived from petroleum products and therefore from fossil sources, with constituents derived from non-fossil resources. Thus, the elastomers based on petroleum products, referred to as synthetic elastomers, are fully or partially replaced with natural rubber. Some or all of the reinforcing fillers that reinforce the compounds are preferably selected from the family of inorganic fillers such as, for example, silica, depending on the expected mechanical and hysteresis properties. In general, the elastomer compounds contain plasticizers to make them more industrially workable. The inventors here are proposing the use of non-aromatic oils, so as to reduce the environmental impact of the tyre.

Lowering the hysteresis of the compounds, i.e. the heat dissipation thereof, is another line pursued by the invention in connection with the endurance and the longevity of the tyre. In general, tyres that are optimized in terms of hysteresis contain low-hysteresis compounds situated at the external periphery such as, for example, in the tread or in the sidewalls. Here, the inventors are proposing novel low-hysteresis compositions for the internal compounds such as, for example, the crown layer edging compounds or else the coupling compound that couples the carcass reinforcement and the crown reinforcement. The improvement in endurance is chiefly the result of the lowering of the operating temperature of the tyre. Compounds of natural rubber, filled with silica, are therefore needed in order to reconcile the lowering of the environmental impact and the lowering of the hysteresis. However, it is also necessary for the mechanical properties of the compounds to be suitable for the demands placed upon them.

The use of elastomer compounds with reinforcing fillers made of silica has been accompanied by a difficulty associated with the build-up of static electricity while the vehicle is running, and with the absence of flow of these charges to the ground on account of the very high resistivity of the elastomer compounds that make up the tread. The static electricity that has thus built up in the tyre is likely, when certain particular conditions are combined, to result in the occupant of the vehicle experiencing an electric shock when they touch the bodywork of the vehicle. Moreover, this static electricity is likely to accelerate the ageing of the tyre on account of the ozone generated by the electric discharge. Depending on the nature of the ground and of the vehicle, it may also be the cause of poor operation of the radio installed in the vehicle on account of the interference it generates.

The tread is therefore divided into three portions: a central portion and two tread wings situated axially on either side of the central part. The central portion of the tread, which is optimized in terms of hysteresis, is therefore not electrically conductive. It is thus appropriate to use an electrically conductive compound for the tread wings. In order to ensure that there is an electrically conductive pathway leading from the tread to the rim, a fine layer of linking compound of the order of 2 mm in thickness connects the tread wings to the carcass reinforcement. The invention is able to provide a solution to the sought-after compromise of having available a tyre that uses materials not derived from fossil products while at the same time having endurance performance that meets expectations and also at the same time being electrically conductive.

According to the invention, the mass of the elastomer compounds derived from non-fossil resources is greater than or equal to 65% of the total mass of the elastomer compounds contained in the tyre.

When considering the relative proportion by mass of the main constituents of the tyre, with the exception of the metal components, the inventors have optimized the composition of the compounds of these constituents made from natural rubber and from silica in order to meet the objective of the invention. By way of illustration, for the tyre size 50/80R57, the following table lists the main constituents of the compounds and their contribution to the mass of the tyre:

TABLE 1

| Tyre constituent | Mass of the constituent as a % of the mass of the tyre excluding metal reinforcers | Comments |
|---|---|---|
| Central part of the tread | 54% | Main part of the tread of the tyre in contact with the ground during running, this represents the highest proportion of compound by mass. |

TABLE 1-continued

| Tyre constituent | Mass of the constituent as a % of the mass of the tyre excluding metal reinforcers | Comments |
| --- | --- | --- |
| Tread wing | 5% | Part at the axial end of the tread with a volume limited to just enough, in contact with the ground and used as a link in the circuit for the removal of electrostatic charge. |
| Sidewall | 12% | By mass, the second constituent of the tyre which connects the tread to the bead that is in contact with the rim. |
| Coupling compound that mechanically couples the carcass reinforcement to the crown reinforcement | 7% | Internal compound that connects the carcass reinforcement to the crown reinforcement of the tyre. It transmits the tension generated by the meridian profile of the carcass layer to the crown reinforcement. |
| Anti-creep compound reinforcing the radially innermost airtight innerliner compound layer in the tyre against creep | 7% | Layer of compound positioned radially on the inside of the carcass reinforcement to limit the creep of the radially innermost airtight innerliner layer of the tyre. |
| Filler compound in the bead between the turn-up of the carcass layer and the sidewall | 5% | Layer of compound contributing to the operation of the bead. |
| Crown layers edging compound | 6% | Layer of compound positioned at the axial ends of the crown layers to improve the endurance thereof. |
| Other compounds | 4% | Chiefly an airtight innerliner compound, compounds coating the metal layers, a bead chafer compound |
| Total | 100% | |

Table 1 above shows the proportion, by mass, of the various compounds of the tyre and orders hierarchically those that need to be addressed as a matter of priority in order to completely or partially eliminate components derived from fossil products. The target of 65% of the mass of the tyre not being derived from petroleum products is achievable by targeting the compounds at the periphery of the tyre such as the tread and the sidewalls, but also by targeting the internal compounds such as the coupling compound that mechanically couples the carcass reinforcement and the crown reinforcement and the anti-creep internal reinforcing compound. All of these compounds have a composition having a natural rubber content in phr of 50 phr or higher, which therefore significantly predominates in comparison to the content of the other components of the compound. The cumulative contribution of each constituent pro-rata with respect to its weight in the tyre leads to the claimed objective.

Still according to the invention, at least 75% of the total mass of the compounds of the tyre is made up of compounds each of which has a viscoelastic loss $\tan(\delta)$ less than or equal to 0.065, and an electrical resistivity greater than or equal to 1E+10 'Ω·cm.

On the basis of the table described hereinabove, that lists the compounds in hierarchical order of mass, the inventors are pursuing a dual objective of using natural rubber at contents greater than or equal to 50 phr, while at the same time using a reinforcing-filler system that is suitable for lowering the hysteresis of the compounds, but which has the disadvantage of leading to compounds that are electrically insulating. Measuring the electrical resistivity of these compounds yields values in excess of 1E+10 'Ω·cm By contrast, the hysteresis characterized by the value of $\tan(\delta)$ is less than or equal to 0.065 for the majority of these compounds.

According to the invention, a layer of electrically conductive linking compound is inserted radially between the carcass-crown coupling layer and the crown reinforcement; said linking layer is in contact at its axially exterior end with the tread wing and at its axially interior end with the carcass layer coating compound.

The purpose of this layer of compound is to ensure the continuity of the removal pathway for removing the electrostatic charge. At its axially exterior end, it is in contact with the tread wing which in turn is in contact with the ground. At the other, axially interior, end, it is in contact with the carcass reinforcement. This layer of linking compound is therefore one link in the electrostatic-charge removal circuit.

Still according to the invention, the tread wing, the linking-compound layer, the carcass layer coating compound and the bead chafer layer, which is in contact with the rim, constitute a preferred conductive pathway for conducting electrical charge between the ground and the rim when the tyre is mounted on its rim and compressed onto the ground.

All the compounds in the electrostatic-charge removal pathway have in common the fact that they have a reinforcement with carbon black in a content at least equal to 35 phr. They also have in common an electrical resistivity of a value less than or equal to 1E+06 'Ω·cm. The objective of obtaining an electrically conductive tyre is the result of the proper functioning of this pathway for removing electrostatic charge. This means that pairwise contact between the compounds in this chain needs to be guaranteed throughout the life of the tyre.

According to one embodiment of the invention, the linking-compound layer, inserted between the carcass-crown coupling layer and the crown layer coating compound is in contact with the tread wing at its radially exterior end over a distance LC1 of at least 10 mm, and is in contact at its second, axially interior, end, with the carcass layer coating compound over a distance LC2 likewise of at least 10 mm.

The interfaces of the compounds that make up the pathway for removal of electrostatic charge have to be in contact in pairs along a length of at least 10 mm, so as to always ensure the continuity of the pathway for the removal of electrostatic charge whatever the manufacturing uncertainties. The pathway for the removal of electrostatic charge needs to be operational throughout the life of the tyre.

Advantageously, the thickness of the linking-compound layer, measured along the normal to the carcass layer passing through the middle of said linking layer has a value greater than or equal to 2 mm.

The layer of linking compound has no mechanical function: it is one link in the electrostatic-charge removal pathway. Its dimensions are therefore set by the limits of the method of manufacture by extrusion or skimming. However, the inventors have validated a minimum thickness of 2 mm in order to ensure stability in the quality of manufacture.

Advantageously again, the linking elastomer compound has a rubber composition based on a matrix of polyisoprene natural or synthetic rubber, on a crosslinking system, and on a reinforcing filler at an overall content at most equal to 50 phr, and predominantly comprising carbon black at a content at least equal to 20 phr, and at most equal to 50 phr.

The linking elastomer compound connects a tread wing to the carcass reinforcement in order to have a continuous pathway for the removal of electrostatic charge. The composition of this compound needs to meet the requirement of having an electrical resistivity less than or equal to 1E+06 ohm-centimetre. This result is obtained for a compound comprising a filler containing predominantly carbon black at a content of at least 20 phr and at most equal to 50 phr.

According to one embodiment of the invention, the elastomer compound of at least one tread wing is an electrically conductive rubber composition based on at least polyisoprene, on a crosslinking system, and on at least one reinforcing filler comprising carbon black, characterized by a BET surface area at least equal to 110 $m^2/g$ and by a content at least equal to 30 phr and at most equal to 80 phr.

The electrical conductivity of the tread wing is obtained by the reinforcing fillers made of carbon black having a BET surface area at least equal to 110 $m^2/g$. The quantity of filler at least equal to 30 phr and at most equal to 80 phr ensures that the electrical resistivity measurement for the compound is less than 1E+06 ohm·cm, which is enough to remove the electrostatic charge.

The tread wings are in contact with the ground, and therefore need to be compatible with the performance demands of grip and wear, as well as having the expected electrical properties. The tread wings thus have a sufficient thickness to be in contact with the ground throughout the lifetime of the tyre.

As a preference, the elastomer compound of the tread central portion is a rubber composition based on at least one diene elastomer, on a crosslinking system, and on a reinforcing filler at an overall content at most equal to 40 phr and comprising carbon black and silica.

In a construction plant tyre, the tread represents around 54% of the total mass of compounds, and, as a result, is the main source of hysteresis. In order to improve endurance, one of the solutions consists in obtaining elastomer compounds with very low hysteresis in order to limit the temperature level. By doing away with the need to have an electrically conductive compound for the central portion of the tread, the composition can be focused on the reduction in hysteresis. In this way, a viscoelastic dynamic loss characterized by tan($\delta$) of around 0.065, measured at 100° C. and for a stress frequency of 10 Hz, is obtained. The elastomer compound of the tread central portion consequently has low hysteresis while having compatible properties for the performance aspects of wear and grip.

As a preference, the edging compound of the protective layer has a rubber composition based on a matrix of polyisoprene natural rubber, on a crosslinking system, and on a reinforcing filler at an overall content at most equal to 50 phr, and predominantly comprising silica at a content at least equal to 30 phr, and at most equal to 50 phr.

Edging compounds are known for their function of blocking shear stresses at the axial end of the layers of the crown. A tyre when running is the site of large-amplitude cyclic shear stresses at the axial ends of the crown layers caused by the periodic flattening of the tread. Crack initiators can develop in this zone, and propagate in the axial direction of the meridian plane. This phenomenon is widely described in the prior art as being a cleavage that arises between the layers of the crown and can, in the worst case, result in deterioration of the tyre. Crack initiators can also propagate in the circumferential direction in a plane parallel to the equatorial plane. In the prior art, this phenomenon is known as detachment, since the shear stresses in this direction separate the reinforcers from the elastomer coating compound.

The inventors wished to preserve the function of blocking shear stresses of the edging compounds while giving them additional properties of low hysteresis. Thus, the Shore A hardness of the edging rubbers is very high with a level of around 67, while having a hysteresis characterized by a tan($\delta$) value of less than 0.065.

Again as a preference, the elastomer edging compound of the working layers has the same composition as the elastomer edging compound of the protective layers.

The elastomer edging compounds are positioned at the end of the working and protective layers. At the ends of the working layers, the shear stresses are greater in amplitude than at the ends of the protective layers. However, for reasons concerned with standardizing manufacture, the same edging compound may be used for both the working and the protective reinforcements.

According to one embodiment of the invention, the compound of the carcass-crown coupling layer has a rubber composition based on a matrix of polyisoprene natural rubber, on a crosslinking system, and on a reinforcing filler at an overall content at most equal to 55 phr, and predominantly comprising silica at a content at least equal to 35 phr, and at most equal to 55 phr.

As seen previously, the carcass-crown coupling layer plays an essential part in the correct operation of the tyre. When the tyre is inflated to its reference pressure, the shearing of this compound in the meridian plane transmits the tension to the crown layers which are distributed through the reinforcers, according to the angle that they form with the circumferential direction. This compound experiences significant deformation and it is therefore necessary to have a formulation that minimizes hysteresis.

The inventors are proposing a compound based on natural rubber reinforced predominantly with silica at a maximum content of 55 phr. This composition has the dual advantage of having low hysteresis and of not using raw materials of petroleum origin. This is all the more necessary as the carcass-crown coupling compound is positioned in the shoulder region of the tyre, which is where the deformations and therefore the temperature are the highest.

Advantageously, the elastomer compound of the anti-creep reinforcer has the same composition as the coupling elastomer compound mechanically coupling the carcass reinforcement and the crown reinforcement.

Most tubeless tyres, intended to be inflated with an inflation gas, such as air for example, include an airtight innerliner layer consisting of a compound impermeable to the inflation gas, covering the interior surface of the tyre. This compound is usually made up of a butyl-based elastomer composition.

In order to limit the creep of the airtight innerliner layer between the reinforcers of the carcass layer, it is standard practice to insert, between the airtight innerliner layer and the carcass layer, a layer of anti-creep compound intended to reduce or even eliminate such creep. The inventors have found that the carcass-crown coupling compound, which is already optimized in terms of hysteresis, and which has suitable mechanical properties, could perform this anti-creep reinforcer function. This choice contributes to the approach whereby manufacture is standardized by limiting the number of different materials employed.

Advantageously also, the elastomer compound of the filler layer in the bead, axially on the outside of the turn-up of the carcass layer, and axially on the inside of the sidewall layer, has the same composition as the coupling elastomer compound mechanically coupling the carcass reinforcement and the crown reinforcement.

In this embodiment, the coupling compound coupling the carcass and crown reinforcements has a rubber composition based on a matrix of at least a blend of polyisoprene natural rubber, on a crosslinking system, and on a reinforcing filler at an overall content at most equal to 55 phr, and predominantly comprising silica at a content at least equal to 35 phr, and at most equal to 55 phr. The viscoelastic loss at 10 Hz for a temperature of 100° C., tan(δ), is less than or equal to 0.05.

The aforementioned composition of the compound provides a good compromise on hysteresis and cohesion and therefore on resistance to cracking. Furthermore, when this compound is used as the filler of the bead, it is in contact with the turn-up of the carcass layer on its axially interior face. More specifically, contact is established with the coating compound coating the carcass layer as it is during use in the anti-creep role on the shoulder. This promotes the quality of adhesion and therefore the strength of the interface. Finally, in the region that is subjected to heavy loads, the elongation properties of this compound contribute to satisfactory endurance of the bead. At a strain of 1.5 MPa at 100% deformation, the elongation of the compound is greater than or equal to 16%.

In one preferred embodiment, the elastomer compound of each sidewall has a rubber composition based on at least one blend of polyisoprene natural rubber and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

The drop in hysteresis needs to be able to be achieved without adversely affecting the mechanical properties such as fatigue strength and, more particularly, resistance to cracking. Specifically, the sidewalls of construction plant tyres are subjected to very high stresses, in terms of flexural deformation, attack and also thermal stresses. This prolonged static or dynamic stressing of the sidewalls in the presence of ozone cause more or less pronounced crazing or cracks to arise, of which the propagation, under the effect of the stresses, may give rise to significant damage to the sidewall in question. It is therefore important that the elastomer compounds that make up the sidewalls of tyres, for construction plant vehicles in particular, have very good mechanical properties, conferred in particular by a high content of reinforcing fillers.

As a preference, the elastomer compound of the tread central portion has a viscoelastic loss tan(δ) with a value at most equal to 0.065.

As a preference, the elastomer compound of each sidewall has a viscoelastic loss tan(δ) with a value at most equal to 0.12.

As a preference, the elastomer compound of the carcass-crown coupling layer has a viscoelastic loss tan(δ) with a value at most equal to 0.06.

As a preference, the elastomer edging compound of the protective layers has a viscoelastic loss tan(δ) with a value at most equal to 0.06.

BRIEF DESCRIPTION OF THE FIGURES

The architecture of the tyre according to the invention will be understood better with reference to FIG. 1, not to scale, which shows a meridian half-section of a tyre that is symmetric about the equatorial plane containing the axis (OZ).

FIG. 1 schematically shows a tyre 1 according to the invention intended to be used on dumper type vehicles.

FIG. 2 depicts an enlargement of FIG. 1 in the shoulder region of the tyre. What is meant by the shoulder region is that portion of the tyre comprised between, on the one hand, the straight line D1, normal to the carcass layer and passing through the middle of the sidewall, and, on the other hand, the straight line D2, normal to the carcass layer passing through the point, situated on the tread, positioned at an axial distance equal to 4/5 of its nominal width relative to the equatorial plane.

Figure 1:
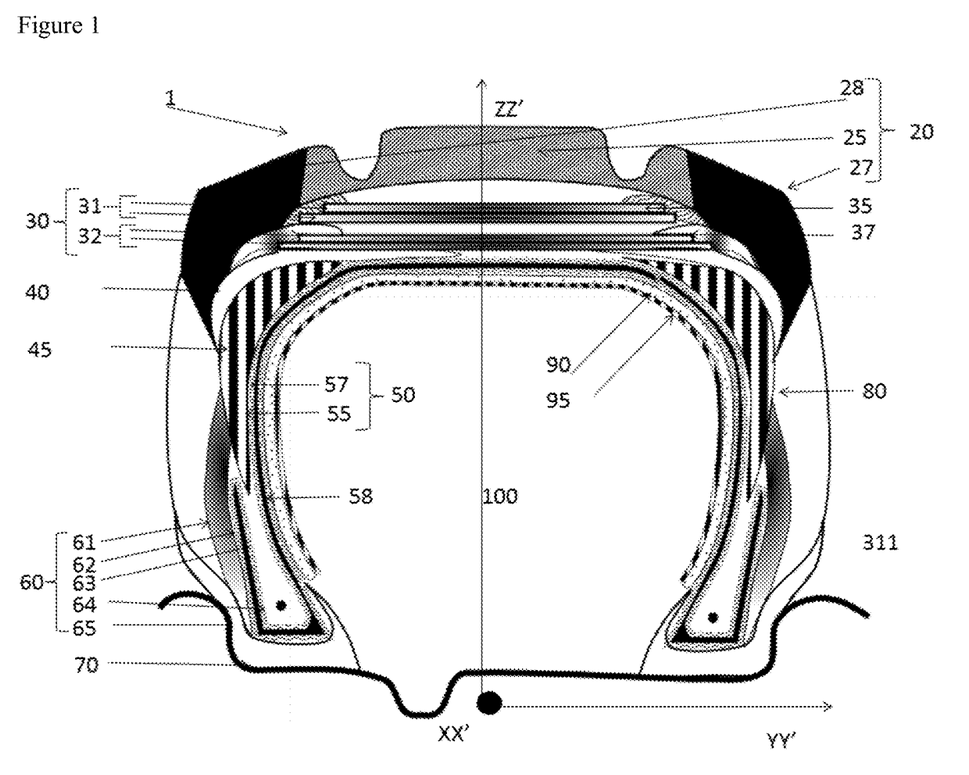

FIG. 1 shows, in a meridian plane of a tyre 1 of the invention:
  a tread 20 comprising, at each axial end, an axial end portion or tread wings (27, 28);
  a crown reinforcement 30, radially on the inside of the tread 20, made up of at least a protective reinforcement 31, and of a working reinforcement 32. The protective reinforcement 31 and working reinforcement 32 are formed of metal reinforcers (311, 322) coated in an elastomer compound;
  a layer of edging elastomer compound 37, 35 respectively, is positioned at the axially exterior ends of the protective layers 31 and of the working layers 32, respectively;
  a carcass reinforcement 50 comprising at least one carcass layer made up of metal reinforcers 55 coated in an electrically conductive coating elastomer compound 57. The metal reinforcers are substantially parallel to one another and form, with the circumferential direction (XX'), an angle of between 85° and 95°. The carcass layer comprises a main part 90 connecting the two beads 60 to one another and wrapped, in each bead 60, around a bead wire 64. The carcass layer is wrapped around the bead wire 64 from the inside towards the outside of the tyre to form a turn-up 62 comprising an end. The turn-up 62 in each bead 60 allows the carcass reinforcement layer 50 to be anchored to the bead wire 64 of the bead 60;
  a layer of compound 45 is inserted between the carcass reinforcement 50 and the crown reinforcement 30 and positioned along the carcass layer 50, axially towards the outside in the shoulder region. This layer of compound 45 couples the carcass reinforcement 50 to the crown reinforcement 30. The pressurizing of the tyre mounted on its rim creates tensions in the reinforcers 55 of the carcass layer 50, and these in turn create shear in the carcass-crown coupling compound 45, which then tensions the reinforcers of the crown reinforcement 30;
  two sidewalls 80 connect the tread wings (27, 28) to the two beads 60;
  an interior cavity (100), intended to be inflated with a gas, and comprising, working outward from this interior cavity:
    an airtight innerliner layer (95) forming the wall of the interior cavity, intended to come into contact with an inflation gas,
    an anti-creep layer (90), on the outside of the airtight innerliner layer.

The top, radially exterior, ends of the tread wings (27, 28) are in contact with the tread central portion 25 over its entire thickness.

Figure 2:
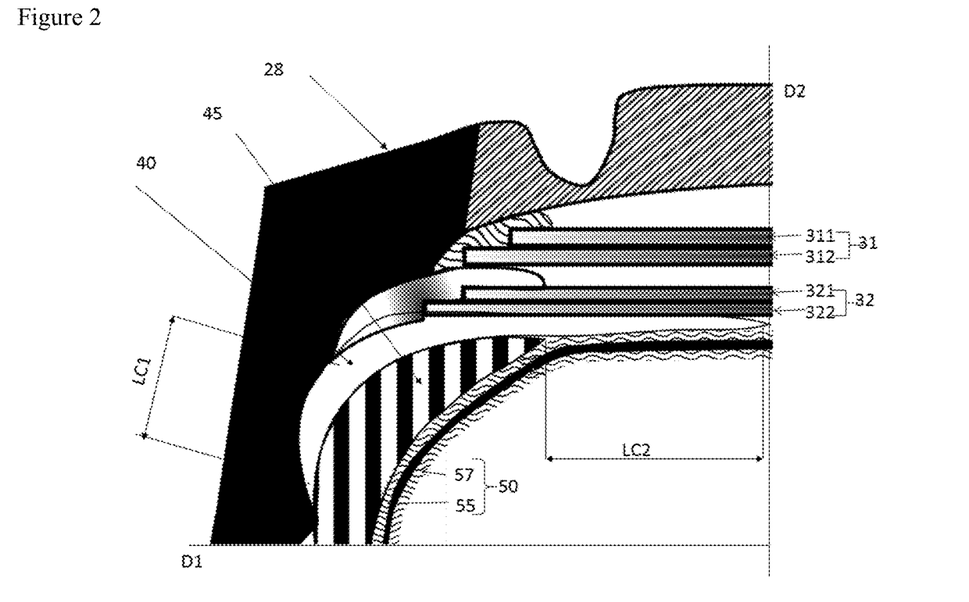

FIG. 2 depicts a detail of FIG. 1 in the shoulder region of the tyre. A layer of electrically conductive linking compound 40 is positioned radially towards the outside on the carcass-crown coupling layer 45. Said linking layer 40 is in contact with the tread wing 27 over a length LC1 at its axially exterior end. At the other, axially interior, end, the layer 40 is in contact with the coating layer 57 that coats the carcass layer over a length LC2.

The invention was studied more particularly in the case of a tyre for a dumper type vehicle, of size 50/80R57 according to the invention, and as shown in FIG. 1.

The results of the invention were observed on a tyre produced according to the invention and compared with the simulation results obtained on a reference tyre of the same size, comprising a one-piece tread, according to the prior art.

The use of natural rubber was standardized across almost all the constituents of the tyre, from the tread to the bead. However, the sidewall, which represents a mass of around 12% of the total mass of the tyre, has a composition containing 50 phr natural rubber and 50 phr butadiene. The very good abrasion-resistance properties of butadiene mean that it is destined for use as the sidewall constituent of the tyre. Antioxidant additives are added to protect it against ageing given its position in the tyre in contact with the ambient air.

The compounds were reinforced with fillers made of silica except in the case of those belonging to the electrostatic charge removal pathway which themselves remain reinforced using carbon black.

Plasticizers are added to certain compounds such as the sidewalls to make them easier to process during the manufacture of the tyre. These plasticizers have been selected as not containing petroleum-derived aromatic oils. One example of such a plasticizer is Tetrakis(dimethylamino) ethylene (TDAE). However, in other instances, the plasticizers have been omitted, as in the case of the tread compounds or else the carcass-crown coupling compound.

More specifically, the inventors have employed the following compositions for the tread:

sents 54% of the total mass of the compounds of the tyre. In other words, the proportion of non-fossil materials in the composition of the central portion of the tread represents a contribution of 34% of the cumulative mass of the compounds in the tyre. For the tread wings and following the same reasoning, the mass of non-fossil materials is around 3% of the cumulative mass of the compounds in the tyre.

The properties of the tread compounds measured on test specimens and resulting from the choices of chemical composition are compiled in Table 3:

TABLE 3

| Property | Elastomer compound of tread wing | Elastomer compound of tread central portion |
|---|---|---|
| Electrical resistivity as Log ($\Omega \cdot$ cm) | 5.7 | >11 |
| Tan($\delta$) | 0.08 | 0.065 |

The compound of the central portion of the tread has a composition based on an elastomer matrix comprising a diene elastomer and a reinforcing filler predominantly comprising a filler covered at least partially with silica.

In this embodiment, the tread central portion is electrically insulating. Electrostatic charges are thus removed along the conduction pathway defined by the invention, which passes via the tread wings that are in contact with the ground and are always electrically conductive.

The tread wings are in contact with the ground when the tyre is running. Reinforcing the basic elastomer using carbon black in adequate quantity ensures an electrical conductivity less than or equal to 1E+06 ohm-centimetre. The volume of this compound is limited to the bare minimum required to ensure conduction of the electrostatic charge. The solution whereby the tread is in three parts allows the content of elastomer derived from natural resources to be increased while at the same time decreasing the hysteresis.

TABLE 2

| Composition | Elastomer: NR (Natural Rubber) | Elastomer: BR (Butadiene) | Filler: Carbon black (1) | Filler: Black covered with silica (2) | Coupling agent | Protective agent (3) | Vulcanizing agent (4) (5) | Plasticizer |
|---|---|---|---|---|---|---|---|---|
| Tread wings | 100 | 0 | 50 | 0 | 1 | 1.5 | 6.6 | 0 |
| Tread central portion | 100 | 0 | 0 | 50 | 1 | 1.5 | 6.6 | 0 |

(1) N134, sold by Cabot Corporation
(2) CRX2125, sold by Cabot Corporation
(3) N-(1,3-Dimethylbutyl)-N-phenyl-para-phenylenediamine, Santoflex 6-PPD, sold by Flexsys
(4) Industrial grade zinc oxide, sold by Umicore
(5) N-Cyclohexyl-2-benzothiazolesulfenamide, Santocure CBS, sold by Flexsys According to the composition of the compound of the central portion of the tread, the mass of natural rubber represents 62.9% of the mass of this compound. Still for the tyre size 50/80 R57, the central portion of the tread repre- In a simplified embodiment of the invention, the inventors used the same composition for the edging compounds of the protective layers and of the working layers, as indicated in Table 4 below:

TABLE 4

| Composition | Elastomer: NR (Natural Rubber) | Elastomer: BR (Butadiene) | Reinforcing filler: Carbon black | Reinforcing filler: Silica | Coupling agent: Silane | Protective agent | Vulcanizing agent | Plasticizer |
|---|---|---|---|---|---|---|---|---|
| Crown layers edging compound | 100 | 0 | 3 | 45 | 6 | 3.92 | 13.7 | 0 |

According to the composition of the edging compound of the layers of the crown reinforcement, which are listed in Table 4, the proportion of natural rubber is 100 phr and the reinforcing fillers represent 45 phr of silica. In order to maintain the endurance of the crown layers against any migration of oil that is detrimental to the endurance of the crown, the composition of the edging compounds does not include plasticizers. According to the composition of this compound, the mass of natural rubber and of silica amounts to 84% of the mass of the compound, and to around 5.1% of the total mass of the compounds.

The layer of coupling compound is inserted between the carcass reinforcement and the crown reinforcement. According to the invention, its composition is in the following table:

TABLE 5

| Composition | Elastomer: NR (Natural Rubber) | Elastomer: BR (Butadiene) | Reinforcing filler: Carbon black N330 | Reinforcing filler: Silica | Coupling agent: Silane | Protective agent | Vulcanizing agent | Plasticizer |
|---|---|---|---|---|---|---|---|---|
| Carcass-crown coupling compound | 100 | | 2 | 35 | 2 | 3.8 | 8.8 | 0 |

The coupling layer coupling the carcass reinforcement to the crown reinforcement has a proportion of 100 phr of natural rubber, reinforced with 35 phr of silica and 2 phr of carbon black. The cumulative mass of the natural rubber and of the silica represents a content of 89% of the mass of this compound, and a content of 6.2% of the total mass of the compounds.

The role played by the coupling compound coupling the carcass reinforcement to the crown reinforcement is essential to the correct operation of the tyre. Specifically, the pressurizing of the tyre mounted on its rim creates tensions in the carcass layer reinforcers, which in turn create shear in the carcass-crown coupling compound, which then tensions the crown reinforcement reinforcers. The mechanical properties of the coupling compound need to be suitable for the operation of the invention. The table below compiles the main mechanical properties of this compound:

TABLE 6

| Carcass-crown coupling compound | Property |
|---|---|
| Electrical resistivity Log (Ω · cm) | >11 |
| G' (MPa) | 1.15 |
| Tan(δ) | 0.06 |

The static stiffness modulus of the carcass-crown coupling compound at 10% deformation is 1.15 MPa and the hysteresis loss measured by tan(δ) is 0.06.

In a drive towards industrial standardization, the inventors found that the coupling compound coupling the carcass reinforcement to the crown reinforcement can also be used in the carcass layer anti-creep reinforcer and in the bead filler. The properties of this compound are compatible with these two constituents of the tyre.

As regards the tyre sidewalls, which represent, by mass, the second greatest constituent mass of elastomer after the tread, the composition thereof needs also to lead to a reduction in the hysteresis. However, this drop in hysteresis needs to be able to be achieved without adversely affecting the mechanical properties such as fatigue strength and, more particularly, the resistance to cracking. Specifically, the sidewalls of construction plant tyres are subjected to very high stresses, in terms of flexural deformation, attack and also thermal stresses. This prolonged static or dynamic stressing of the sidewalls in the presence of ozone causes more or less pronounced crazing or cracks to arise, of which the propagation, under the effect of the stresses, may give rise to significant damage to the sidewall in question. It is therefore important that the elastomer compounds that make up the sidewalls of tyres have very good mechanical properties, conferred in particular by a high content of reinforcing fillers. The inventors are proposing the following composition:

TABLE 7

| Composition | Elastomer: NR (Natural Rubber) | Elastomer: BR (Butadiene) | Reinforcing filler: Carbon black | Reinforcing filler: Silica | Coupling agent: Silane | Protective agent | Vulcanizing agent | Plasticizer |
|---|---|---|---|---|---|---|---|---|
| Sidewall compound | 50 | 50 | 3 | 29 | 0 | 4 | 5.3 | 10 |

The composition of the sidewalls leads to a low hysteresis measured by a tan(δ) value less than or equal to 0.12. The plasticizers for improving industrial workability amount to 10 phr of the oil TDAE. The cumulative mass of natural rubber and of silica represents a proportion of 52.2% of the mass of this compound. Bearing in mind the 12% proportion that the mass of the sidewall represents with respect to the mass of the tyre excluding its metal reinforcers, the mass of the natural rubber combined with that of the silica represents a proportion of 6.3% of the total mass of the compounds of the tyre.

Table 8 below recaps the proportion of non-fossil materials present in the tyre of the invention. The proportion of each constituent by mass is with respect to the total mass of the tyre without its metal reinforcers:

TABLE 8

| Tyre constituent | Mass of the constituent as a % of the mass of the tyre excluding metal reinforcers | Content (%) of NR + Silica according to the composition of the compound | Mass as % of the non-fossil materials (NR + Silica) | Comments |
|---|---|---|---|---|
| Central part of the tread | 54% | 62.9% | 34.0% | Main part of the tread of the tyre in contact with the ground during running, this represents the highest proportion of compound by mass. |
| Tread wing | 5% | 62.9% | 3.1% | Part at the axial end of the tread with a volume limited to just enough, in contact with the ground and used as a link in the circuit for the removal of electrostatic charge. |
| Sidewall | 12% | 52.2% | 6.3% | By mass, the second constituent of the tyre which connects the tread to the bead that is in contact with the rim. |
| Coupling compound that mechanically couples the carcass reinforcement to the crown reinforcement | 7% | 88.8% | 6.2% | Internal compound that connects the carcass reinforcement to the crown reinforcement of the tyre. It transmits the tension generated by the meridian profile of the carcass layer to the crown reinforcement. |
| Anti-creep compound reinforcing the radially innermost airtight innerliner compound layer in the tyre against creep | 7% | 88.8% | 6.2% | Layer of compound positioned radially on the inside of the carcass reinforcement to limit the creep of the radially innermost airtight innerliner layer of the tyre. |
| Filler compound in the bead between the turn-up of the carcass layer and the sidewall | 5% | 88.8% | 4.4% | Layer of compound contributing to the operation of the bead. |
| Crown layers edging compound | 6% | 84.3% | 5.1% | Layer of compound positioned at the axial ends of the crown layers to improve the endurance thereof. |

TABLE 8-continued

| Tyre constituent | Mass of the constituent as a % of the mass of the tyre excluding metal reinforcers | Content (%) of NR + Silica according to the composition of the compound | Mass as % of the non-fossil materials (NR + Silica) | Comments |
|---|---|---|---|---|
| Other compounds | 4% | 0% | 0% | Chiefly an airtight innerliner compound, compounds coating the metal layers, a bead chafer compound |
| Total | 100% |  | 65.3% |  |

Table 9 below is a recap of the viscoelastic loss and electrical resistivity measurements for each constituent:

TABLE 9

| Tyre constituent | Viscoelastic loss | Electrical resistivity (Log) |
|---|---|---|
| Central part of the tread | 0.065 | 11 |
| Tread wing | 0.08 | 6 |
| Sidewall | 0.12 | >11 |
| Coupling compound that mechanically couples the carcass reinforcement to the crown reinforcement | 0.06 | >11 |
| Anti-creep compound reinforcing the radially innermost airtight innerliner compound layer in the tyre against creep | 0.06 | >11 |
| Filler compound in the bead between the turn-up of the carcass layer and the sidewall | 0.06 | >11 |
| Crown layers edging compound | 0.065 | >11 |

The above-described tyre of the invention does therefore indeed meet the claimed objective.

Table 10 below sets out the overall results obtained on a tyre of the invention:

TABLE 10

| Property | Tyre of the invention | Reference tyre, routine operation |
|---|---|---|
| Electrical resistance R of the tyre in Log (R) in ohms | <8 | 10 |
| Temperature in the tread | 10 to 15° lower | Base 100 |
| Rolling resistance | 90 | 100 |

The electrical resistance of the tyre of the invention is reduced by at least a factor of 100 by comparison with the routine operation reference.

The objective of the invention has been achieved with a tyre made up of materials not derived from fossil resources, which materials amount to 65% by mass excluding metal components. In use, the environmental impact is significantly reduced by a lower vehicle fuel consumption as a result of a 10% improvement in rolling resistance.

The invention claimed is:
1. A tire for a heavy-duty vehicle of construction plant type comprising:
elastomer compounds derived from non-fossil, fossil, or both non-fossil and fossil resources, any elastomer compound having a viscoelastic loss tan($\delta$) defined as a ratio of a viscous shear modulus G" to an elastic shear modulus G', the modulus values being measured at a frequency of 10 Hz at a temperature of 100° C., and any electrically conductive elastomer compound being defined as having an electrical resistivity less than or equal to 1E+06 ohm-centimeter ('$\Omega$·cm), measured in accordance with standard ASTM-D257;
a tread having two axial end portions that are axially separated by a tread central portion;
a crown reinforcement, radially on an inside of the tread, comprising at least one protective reinforcement and a working reinforcement, the reinforcements being formed respectively of protective layers and of working layers containing metal reinforcers coated with an elastomer compound, the layers at their axial ends having a layer of edging compound;
a carcass reinforcement, radially on an inside of the crown reinforcement, comprising at least one carcass layer made up of metal reinforcers coated in an electrically conductive coating elastomer compound, the metal reinforcers being substantially mutually parallel and forming, with a circumferential direction, an angle of between 85° and 95°, each carcass layer comprising a main part, connecting two beads to one another and wrapped, within each bead, around a bead wire to form a turn-up;
a carcass-crown coupling layer consisting of an electrically conductive elastomer compound and inserted between the carcass reinforcement and the crown reinforcement, axially toward an outside in a shoulder region; and
two sidewalls connecting the two axial end portions of the tread to the two beads, the beads comprising a bead chafer layer intended to come into contact with a rim,
wherein a mass of the elastomer compounds derived from non-fossil resources is greater than or equal to 65% of a total mass of the elastomer compounds contained in the tire,
wherein at least 75% of the total mass of the elastomer compounds contained in the tire is made up of elastomer compounds each of which has a viscoelastic loss tan($\delta$) less than or equal to 0.065 and an electrical resistivity greater than or equal to 1E+10 '$\Omega$·cm,
wherein a linking layer, made up of an electrically conductive elastomer compound is inserted radially between the carcass-crown coupling layer and the crown reinforcement, and is in contact at its axially exterior end with one of the two axial end portions of the tread and at its axially interior end with the carcass layer coating compound, and wherein the one of the two axial end portions of the tread, the linking layer, the carcass layer electrically conductive coating elastomer compound, and the bead chafer layer constitute a conductive pathway for conducting electrical charge between a ground and the rim when the tire is mounted on the rim and compressed onto the ground.

2. The tire according to claim 1, wherein the linking layer is in contact with the on axial end portion of the tread at its radially exterior end over a distance LC1 equal to at least 10 mm, and is in contact at its axially interior end with the carcass layer electrically conductive coating elastomer compound over a distance LC2 equal to at least 10 mm.

3. The tire according to claim 1, wherein a thickness of the linking layer, measured along a straight line normal to the carcass layer passing through the middle of the linking layer is greater than or equal to 2 mm.

4. The tire according to claim 1, wherein the linking layer comprises a rubber composition based on a matrix of polyisoprene natural or synthetic rubber, on a crosslinking system, and on a reinforcing filler at an overall content at most equal to 50 phr, and predominantly comprising carbon black at a content at least equal to 20 phr, and at most equal to 50 phr.

5. The tire according to claim 1, wherein the elastomer compound of at least one axial end portion of the tread is an electrically conductive rubber composition based on at least polyisoprene, on a crosslinking system, and on at least one reinforcing filler comprising carbon black, characterized by a BET surface area at least equal to 110 m²/g and by a content at least equal to 30 phr and at most equal to 80 phr.

6. The tire according to claim 1, wherein an elastomer compound of the central portion of the tread is a rubber composition based on at least one diene elastomer, on a crosslinking system, and on a reinforcing filler at an overall content at most equal to 40 phr and comprising carbon black and silica.

7. The tire according to claim 1, wherein the edging compound of the protective layers has a rubber composition based on a matrix of polyisoprene natural rubber, on a crosslinking system, and on a reinforcing filler at an overall content at most equal to 50 phr, and predominantly comprising silica at a content at least equal to 30 phr, and at most equal to 50 phr.

8. The tire according to claim 1, wherein the edging compound of the working layers has the same composition as the edging compound of the protective layers.

9. The tire according to claim 1, wherein the electrically conductive elastomer compound of the carcass-crown coupling layer has a rubber composition based on a matrix of polyisoprene natural rubber, on a crosslinking system, and on a reinforcing filler at an overall content at most equal to 55 phr, and predominantly comprising silica at a content at least equal to 35 phr, and at most equal to 55 phr.

10. The tire according to claim 1, wherein the tire further comprises an anti-creep reinforcer, and the elastomer compound of the anti-creep reinforcer has the same composition as the carcass-crown coupling layer.

11. The tire according to claim 1, wherein each bead comprises a filler layer, and the elastomer compound of the filler layer, axially on an outside of the turn-up of the carcass layer, and axially on an inside of a sidewall has the same composition as the carcass-crown coupling layer.

12. The tire according to claim 1, wherein the elastomer compound of each sidewall has a rubber composition based on at least one blend of polyisoprene natural rubber and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

13. The tire according to claim 1, wherein the elastomer compound of the tread central portion has a viscoelastic loss tan($\delta$) with a value at most equal to 0.065.

14. The tire according to claim 1, wherein the elastomer compound of each sidewall has a viscoelastic loss tan($\delta$) with a value at most equal to 0.12.

15. The tire according to claim 1, wherein the elastomer compound of the carcass-crown coupling layer has a viscoelastic loss tan($\delta$) with a value at most equal to 0.06.

* * * * *